(12) United States Patent
Zhuge et al.

(10) Patent No.: US 7,783,666 B1
(45) Date of Patent: Aug. 24, 2010

(54) CONTROLLING ACCESS TO STORAGE RESOURCES BY USING ACCESS PATTERN BASED QUOTAS

(75) Inventors: John Zhuge, San Jose, CA (US); Paul Yuedong Mu, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 337 days.

(21) Appl. No.: 11/862,140

(22) Filed: Sep. 26, 2007

(51) Int. Cl.
G06F 7/00 (2006.01)
G06F 17/30 (2006.01)

(52) U.S. Cl. ..................................... 707/783
(58) Field of Classification Search ........................ None
See application file for complete search history.

(56) References Cited

U.S. PATENT DOCUMENTS

| | | | |
|---|---|---|---|
| 4,104,718 A | 8/1978 | Poublan et al. |
| 4,937,763 A | 6/1990 | Mott |
| 5,067,099 A | 11/1991 | McCown et al. |
| 5,138,712 A | 8/1992 | Corbin |
| 5,261,051 A | 11/1993 | Masden et al. |
| 5,392,446 A | 2/1995 | Tower et al. |
| 5,396,609 A | 3/1995 | Schmidt et al. |
| 5,604,862 A | 2/1997 | Midgely et al. |
| 5,623,600 A | 4/1997 | Ji et al. |
| 5,630,049 A | 5/1997 | Cardoza et al. |
| 5,649,099 A | 7/1997 | Theimer et al. |
| 5,649,152 A | 7/1997 | Ohran et al. |
| 5,682,535 A | 10/1997 | Knudsen et al. |
| 5,771,354 A | 6/1998 | Crawford |
| 5,787,409 A | 7/1998 | Seiffert et al. |
| 5,819,047 A | 10/1998 | Bauer et al. |
| 5,819,292 A | 10/1998 | Hitz et al. |
| 5,835,953 A | 11/1998 | Ohran |
| 5,918,008 A | 6/1999 | Togawa et al. |
| 5,925,126 A | 7/1999 | Hsieh |
| 5,933,594 A | 8/1999 | La Joie et al. |
| 5,946,690 A | 8/1999 | Pitts |
| 5,963,962 A | 10/1999 | Hitz et al. |

(Continued)

FOREIGN PATENT DOCUMENTS

EP 0903901 3/1999

(Continued)

OTHER PUBLICATIONS

Gud, Amit et al., "Elastic Quota File System (EQFS)," Department of D.Y. Patil College of Engg., Dec. 4, 2005, downloaded from http://people.cis.ksu.edu/~gud/docs/ppt/eqfs_ppt.pdf, 20 pages.

(Continued)

Primary Examiner—Uyen T. Le
(74) Attorney, Agent, or Firm—Perkins Coie LLP

(57) ABSTRACT

An apparatus and a method that limits a user's access to data of the storage system based on an access quota. The method may include determining an access pattern of data access requests to storage resources by a user, and comparing the access pattern of the user against an access quota, as defined by an access policy. Based on the comparison, if the user's access to the storage resources has exceeded the access quota, the storage system can limit access to the user to the storage resources.

17 Claims, 7 Drawing Sheets

U.S. PATENT DOCUMENTS

| | | | |
|---|---|---|---|
| 5,968,176 | A | 10/1999 | Nessett et al. |
| 6,014,700 | A | 1/2000 | Bainbridge et al. |
| 6,061,504 | A | 5/2000 | Tzelnic et al. |
| 6,076,105 | A | 6/2000 | Wolff et al. |
| 6,088,803 | A | 7/2000 | Tso et al. |
| 6,101,558 | A | 8/2000 | Utsunomiya et al. |
| 6,108,785 | A | 8/2000 | Poisner |
| 6,115,741 | A | 9/2000 | Domenikos et al. |
| 6,138,126 | A | 10/2000 | Hitz et al. |
| 6,148,349 | A | 11/2000 | Chow et al. |
| 6,185,598 | B1 | 2/2001 | Farber et al. |
| 6,189,114 | B1 | 2/2001 | Orr et al. |
| 6,226,752 | B1 | 5/2001 | Gupta et al. |
| 6,230,200 | B1 | 5/2001 | Forecast et al. |
| 6,237,114 | B1 | 5/2001 | Wookey et al. |
| 6,253,217 | B1 | 6/2001 | Dourish et al. |
| 6,256,773 | B1 | 7/2001 | Bowman-Amuah |
| 6,266,774 | B1 | 7/2001 | Sampath et al. |
| 6,275,393 | B1 | 8/2001 | Baudelot et al. |
| 6,275,939 | B1 | 8/2001 | Garrison |
| 6,311,213 | B2 | 10/2001 | Dawson et al. |
| 6,324,581 | B1 | 11/2001 | Xu et al. |
| 6,327,594 | B1 | 12/2001 | Van Huben et al. |
| 6,327,658 | B1 | 12/2001 | Susaki et al. |
| 6,327,677 | B1 | 12/2001 | Garg et al. |
| 6,338,141 | B1 | 1/2002 | Wells |
| 6,401,126 | B1 | 6/2002 | Douceur et al. |
| 6,405,327 | B1 | 6/2002 | Sipple et al. |
| 6,490,666 | B1 | 12/2002 | Cabrera et al. |
| 6,502,102 | B1 | 12/2002 | Haswell et al. |
| 6,519,679 | B2 | 2/2003 | Devireddy et al. |
| 6,523,027 | B1 | 2/2003 | Underwood |
| 6,542,967 | B1 | 4/2003 | Major |
| 6,560,632 | B1 | 5/2003 | Chess et al. |
| 6,577,636 | B1 | 6/2003 | Sang et al. |
| 6,606,744 | B1 | 8/2003 | Mikurak |
| 6,697,846 | B1 | 2/2004 | Soltis |
| 6,721,721 | B1 | 4/2004 | Bates et al. |
| 6,721,862 | B2 | 4/2004 | Grant et al. |
| 6,728,766 | B2 | 4/2004 | Cox et al. |
| 6,757,753 | B1 | 6/2004 | DeKoning et al. |
| 6,757,794 | B2 | 6/2004 | Cabrera et al. |
| 6,785,732 | B1 | 8/2004 | Bates et al. |
| 6,801,949 | B1 | 10/2004 | Bruck et al. |
| 6,802,012 | B1 | 10/2004 | Smithson et al. |
| 6,832,313 | B1 | 12/2004 | Parker et al. |
| 6,859,841 | B2 | 2/2005 | Narad et al. |
| 6,918,113 | B2 | 7/2005 | Patel et al. |
| 6,931,540 | B1 | 8/2005 | Edwards et al. |
| 6,970,939 | B2 | 11/2005 | Sim |
| 6,981,070 | B1 | 12/2005 | Luk et al. |
| 7,020,697 | B1 | 3/2006 | Goodman et al. |
| 7,032,022 | B1 | 4/2006 | Shanumgam et al. |
| 7,089,293 | B2 | 8/2006 | Grosner et al. |
| 7,124,180 | B1 | 10/2006 | Ranous |
| 7,127,388 | B2 | 10/2006 | Yates et al. |
| 7,146,377 | B2 | 12/2006 | Nowicki et al. |
| 7,237,027 | B1 | 6/2007 | Raccah et al. |
| 7,293,083 | B1 | 11/2007 | Ranous et al. |
| 7,349,960 | B1 | 3/2008 | Pothier et al. |
| 7,555,482 | B2 * | 6/2009 | Korkus ............................ 707/9 |
| 2001/0013059 | A1 | 8/2001 | Dawson et al. |
| 2001/0013064 | A1 | 8/2001 | Cox et al. |
| 2002/0040405 | A1 | 4/2002 | Gold |
| 2002/0042866 | A1 | 4/2002 | Grant et al. |
| 2002/0087479 | A1 | 7/2002 | Malcolm |
| 2002/0103783 | A1 | 8/2002 | Muhlestein |
| 2002/0103907 | A1 | 8/2002 | Petersen |
| 2002/0120741 | A1 | 8/2002 | Webb et al. |
| 2002/0124090 | A1 | 9/2002 | Poier et al. |
| 2002/0133491 | A1 | 9/2002 | Sim et al. |
| 2002/0133561 | A1 | 9/2002 | O'Brien et al. |
| 2002/0161855 | A1 | 10/2002 | Manczak et al. |
| 2002/0194251 | A1 | 12/2002 | Richter et al. |
| 2003/0031176 | A1 | 2/2003 | Sim |
| 2003/0046396 | A1 | 3/2003 | Richter et al. |
| 2003/0056069 | A1 | 3/2003 | Cabrera et al. |
| 2003/0120476 | A1 | 6/2003 | Yates et al. |
| 2003/0191957 | A1 | 10/2003 | Hypponen et al. |
| 2003/0195895 | A1 | 10/2003 | Nowicki et al. |
| 2003/0236745 | A1 | 12/2003 | Hartsell et al. |
| 2004/0024688 | A1 | 2/2004 | Bi et al. |
| 2004/0044744 | A1 | 3/2004 | Grosner et al. |
| 2004/0078419 | A1 | 4/2004 | Ferrari et al. |
| 2004/0148382 | A1 | 7/2004 | Narad et al. |
| 2004/0226010 | A1 | 11/2004 | Suorsa |
| 2004/0230795 | A1 | 11/2004 | Armitano et al. |
| 2005/0138204 | A1 | 6/2005 | Iyer et al. |
| 2005/0198238 | A1 | 9/2005 | Sim et al. |
| 2005/0203881 | A1 * | 9/2005 | Sakamoto et al. .............. 707/3 |
| 2005/0226153 | A1 * | 10/2005 | Scifres et al. ............... 370/232 |
| 2005/0251500 | A1 | 11/2005 | Vahalia et al. |
| 2006/0195616 | A1 | 8/2006 | Petersen |
| 2008/0027746 | A1 | 1/2008 | Exall et al. |
| 2008/0066151 | A1 | 3/2008 | Thomsen et al. |

FOREIGN PATENT DOCUMENTS

| | | |
|---|---|---|
| EP | 1100001 | 5/2001 |
| JP | 2004523820 | 8/2006 |
| WO | WO-9739399 | 10/1997 |
| WO | WO-9749252 | 12/1997 |
| WO | WO-02044862 | 6/2002 |
| WO | WO-02095588 | 11/2002 |

OTHER PUBLICATIONS

Leach, P. et al., "A Universally Unique Identifier (UUID) URN Namespace," The Internet Society, Jul. 2005, downloaded from Http://www.ietf.org/rfc/rfc4122.txt on Aug. 9, 2007, 23 pages.

"It Value Card Published: Dec. 2005, Microsoft File Server Resource Manager," Microsoft Corporation, Dec. 2005, 2 pages.

Lomb, R. et al., "Storage Management Solutions for Distributed Computing Environments" Hewlett-Packard Journal, Oct. 9, 1996, pp. 1-12.

Jieh-Sheng, Lee, "A Generic Virus Detection Agent on the Internet," System Sciences, 1997, 4:210-219, Center of Computing Services, Hua-Fan Institute of Technology, Shi-Tang, Taipei, Taiwan.

Northern, Peter, et al., "Chapter 3—Norton Utilities: The System Doctor Is In." and "Chapter 13— Norton Utilities: the Better Part of Valor. . . ," Peter Norton's Complete Guide to Norton SystemWorks 2.0, 1999, Sams; 38 pages.

Wybranietz, D., et al., "Monitoring and Performance Measuring Distributed Systems During Operation." Joint Internation Conference on Measurment and Modeling of Computer System, 1988, pp. 197-206, ACM Press, New York, NY.

Slashdot.com: Tux2: The Filesystem That Would Be King—Microsoft Internet Explorer 16 pages. Oct. 20, 2000.

iCap Forum, "iCap - FAQ's and Answers", http://www.i-caporg/icap/faqs.cfm., Jul. 13, 2001, 2 pages.

Network Appliance, Inc., "Data ONTAP Event Management System", Aug. 10, 2000, 19 pages.

European Search Report of EP Application No. EP01987296, Sep. 14, 2006, 2 pages.

European Search Report of EP Application No. EP01273994, Sep. 13, 2006, 2 pages.

Co-pending U.S. Appl. No. 10/777,418, filed Feb. 11, 2004.

Co-pending U.S. Appl. No. 11/862,136, filed Sep. 26, 2007.

Co-pending U.S. Appl. No. 11/862,137, filed Sep. 26, 2007.

Final Office Action Mailed May 11, 2009 in Co-pending U.S. Appl. No. 10/777,418, filed Feb. 11, 2004.

Final Office Action Mailed Apr. 4, 2008 in Co-pending U.S. Appl. No. 10/777,418, filed Feb. 11, 2004.

Non-Final Office Action Mailed Nov. 4, 2009 in Co-pending U.S. Appl. No. 10/777,418, filed Feb. 11, 2004.

Non-Final Office Action Mailed Oct. 27, 2008 in Co-pending U.S. Appl. No. 10/777,418, filed Feb. 11, 2004.
Non-Final Office Action Mailed Sep. 27, 2007 in Co-pending U.S. Appl. No. 10/777,418, filed Feb. 11, 2004.

Notice of Allowance Mailed May 18, 2010 in Co-Pending U.S. Appl. No. 10/777,418, filed Feb. 11, 2004.

* cited by examiner

CONTROLLING ACCESS TO STORAGE RESOURCES BY USING ACCESS PATTERN BASED QUOTAS

RELATED APPLICATIONS

This application is related to co-pending U.S. patent application Ser. No. 11/862,136, entitled, "Multiple Node Quota Filter," filed on Sep. 26, 2007, which is assigned to the assignee of the present application.

TECHNICAL FIELD

This invention relates to the field of network data storage systems and, in particular, to quotas used in network data storage systems.

BACKGROUND

Various forms of network data storage systems are known today. These forms include network attached storage (NAS), storage area networks (SANs), and others. Network storage systems are commonly used for a variety of purposes, such as providing multiple users with access to shared data, backing up critical data (e.g., by data mirroring), etc.

A network storage system typically includes at least one storage server, which is a processing system configured to store and retrieve data on behalf of one or more client processing systems ("clients"). A typical storage server manages one or more logical data container storing data, such as a volume. A volume is a logical data set which is an abstraction of physical storage (e.g., disks) or parts thereof into a single logical storage object, and which is managed as a single administrative unit, such as by a file system layer. A volume may be defined from a larger group of available storage, such as an aggregate. A volume may be logically broken down into logical data sets (storage objects), which may contain one or more Redundant Array of Independent/Inexpensive Disks (RAID) groups. An aggregate is a logical aggregation of physical storage, such as a logical container for a pool of storage, combining one or more physical mass storage devices (e.g., disks) or parts thereof into a single logical storage object, which contains or provides storage for one or more other logical data sets at a higher level of abstraction (e.g., volumes). A file system layer, which manages the underlying file system, is an application-level programmatic entity, which imposes a structure (e.g., hierarchical structure) on files, directors and/or other data contains stored and/or managed by a storage server, and which services read/write requests from clients of the storage server.

Storage administrators need a method to define and limit the amount of storage that is used by individuals who have access to a shared data storage resource. The administrator may wish to limit storage to particular individuals for administrative reasons, financial reasons, or the like. The administrators may also wish to control the rate of growth of data stored in the storage system. In order to limit the amount of storage used by an individual, some file systems, managed by the file system layer, have a quota of storage resources that can be used by a user to limit the storage usage by a user on a volume. A quota is a limit on the amount of storage resources that can be allocated to the user. There are different types of quotas, for example, usage quota, block quota, file quota, or inode quota. Usage and block quota limit the amount of disk area that can be used. File and inode quotas limit the number of files and directories that can be created. Specific quotas can be applied to individual users, or alternatively, a default user quota can be established that applies to all users utilizing space within the volume. An inode stores basic information about a file, directory, or file system object. Quotas may also be applied to a group of users in similar manners as with individual users. That is, a system or storage administrator defines a usage or file quota specific to a certain user or group of users. Alternatively, quotas may be implemented for other entities than an individual user or a group of users, such as Human Resources (HR), Engineering, or the like. In addition, administrators typically define a warning level, i.e., soft quota, at which users are informed they are nearing their limit, which is less than the effective limit, i.e., a hard quota. Also, there may be a grace interval, which allows users to temporarily violate their quotas by certain amounts if necessary. In defining and implementing quotas on storage server, an administrator can prevent one user from consuming an entire file system's resources, or create a system of tiered access, in which users can have different levels of restriction. The access quotas may be used, for example, to provide different levels of service based upon the needs of individual clients.

In conventional systems, not only are quotas specific to individual file systems, the quotas are also based on the usage of storage resources of a particular user, and not based on an access pattern. In particular, quotas are specific to a single volume on the storage server, and are implemented on a per-volume basis to specifically limit the amount of data that can be stored on a particular volume. Since the user or group of user's access patterns affect performance of the storage system, the performance of these conventional systems are possibly subject to abuse by certain users or groups of users. In these conventional systems, an administrator cannot limit particular access patterns, such as the amount that any user can access data in a storage system or the amount that a particular user can access particular data, such as sensitive or confidential data. For example, one particular user can attempt to access a certain directory multiple times in a short time span, creating a burden on the storage system to service these requests. This type of scenario may create a delay in servicing requests of other users of the storage system. The conventional systems cannot limit or prevent the user from performing such operations, and as such, the particular user may be over-utilizing the storage resources to the detriment of other users. This problem is particularly relevant in situations where the particular user is considered to be a lower-priority user than other (higher-priority) users. In this scenario, the lower-priority user affects the server performance with respect to the higher-priority users, and possibly the quality of service provided by the storage system. The conventional storage systems that implement usage quota on a per-volume basis are inadequate to implement quota based on the user's access to the data storage system.

SUMMARY OF INVENTION

Described herein are an apparatus and a method for limiting access by a user to storage resources of a storage system when an access quota has been exceeded. The method may include determining an access pattern of data access requests by a user to storage resources of a storage system having at least one storage server that manages at least one logical data container storing data. Once the access pattern is determined, the access pattern is compared against the access quota, which is defined by an access quota policy. When the access quota has been exceeded, access to the storage resources by the user is limited.

BRIEF DESCRIPTION OF THE DRAWINGS

The present invention is illustrated by way of example, and not by way of limitation, in the figures of the accompanying drawings.

DETAILED DESCRIPTION

Figure 1:
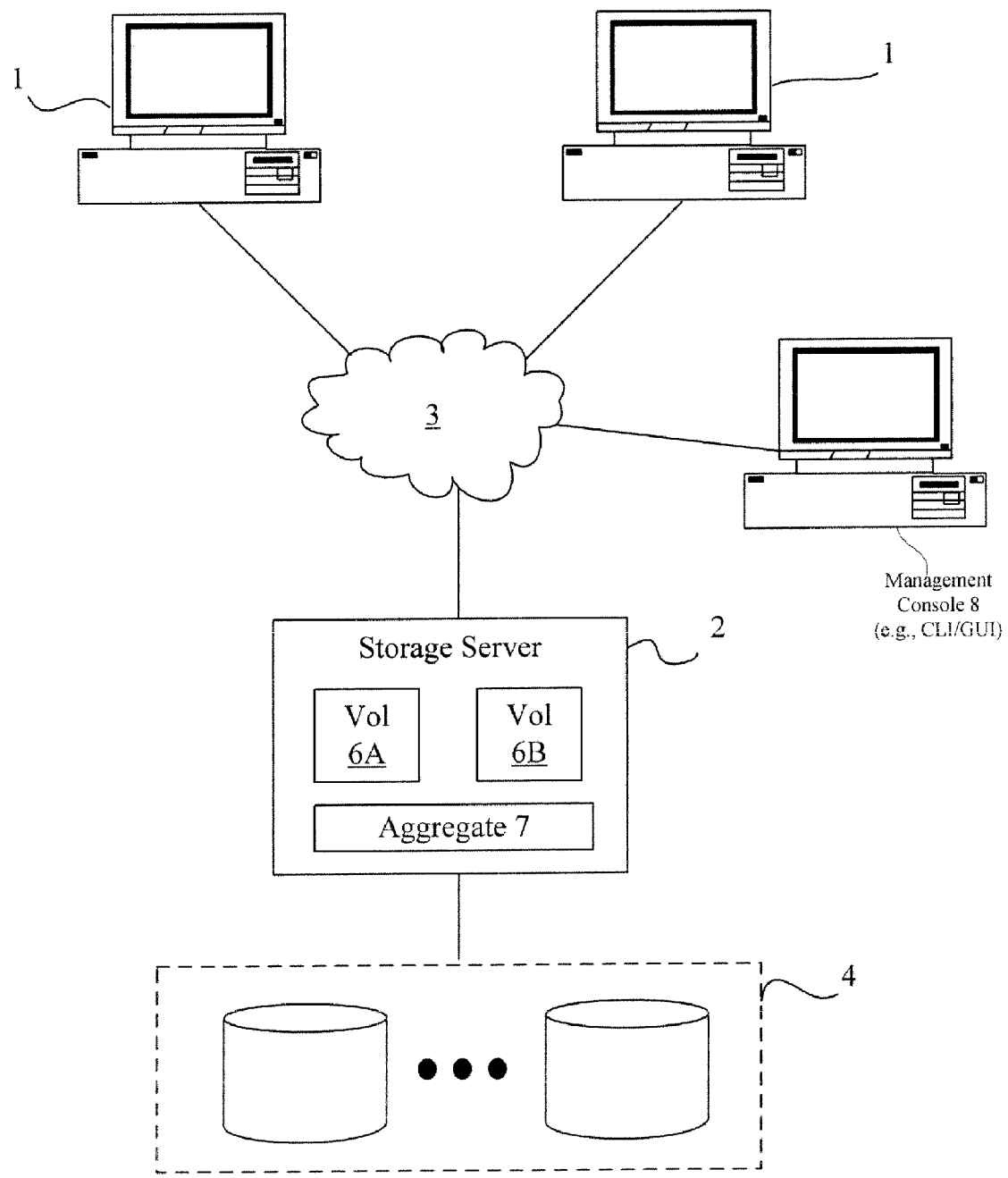
FIG. 1 illustrates a storage network environment.

Described herein are apparatuses and methods that limit a user's access to data of the storage system based on an access quota. The access quota is defined according to an access quota policy, and is configured to limit a user or a group of users to a defined amount (e.g., quota) of access to storage resources, such as the amount of access to particular directories or files, particular volumes, particular disk space, or the like. The embodiments described herein can be used to prevent lower-priority users from over-utilizing system resources to the detriment of higher-priority users. The embodiments may preempt suspected read data access requests of confidential information by a user that should not be privy to the confidential information. The embodiments described herein may also be used to perform smart audit alerts or confidential read data access requests, as described further below.

The access quota management may be implemented in a protocol server or engine, in a file system. Alternatively, the access quota management may be implemented as a filter in the protocol layer or in the file system layer. The access quota management monitors access patterns of the user and may record them into a persistent storage. The access quota management compares the access patterns with an access quota policy. The access quota policy defines what kind of access patterns trigger specified access quota actions (e.g., system rules). The access quota management coordinates with an access quota enabler to trigger the access quota actions. These access quota actions may include access denial, change of the user's access priority, audit, or other correlated operations. In one embodiment, the access quota policy defines an access quota that defines the number of data access requests permitted by a user during a period of time. For example, the access quota can prevent a user from performing a large directory listing within a certain period. Another example includes an access quota that deletes a file after a specified number of reads of certain files.

The access quota may limit a user or a group of users to a defined access pattern of storage resources of a storage system. The method may include determining an access pattern of data access requests to storage resources by a user, for example, using a pluggable access quota filter on the storage server. The access pattern of the user is compared against an access policy, which is defined by an access quota policy. Based on the comparison, the user is limited access to storage resources when the access quota has been exceeded.

In operation, the access quota filter monitors to check for quota-sensitive data access requests against the access quota for the given user or group. Examples of quota-sensitive data access requests may include creating a new file, reading an existing file, deleting an existing file, writing to an existing file to append the data of the existing file, or the like. If the access quota (e.g., hard or soft quota) is met or exceeded, based on the quota definition, certain system rules can be executed in response. Although at least some embodiments described herein are described with respect to implementing an access quota on a single node, embodiments may also be implemented over multiple nodes.

When a soft quota warning level is violated, the storage system can send the user, as well as possibly the administrator, a message indicating that the user is approaching the access quota specified for the particular user. In one embodiment, no other action is taken when the soft quota is violated. However, when the hard quota limit is about to be violated, the storage system can prevent data access requests (e.g., read data access requests) that would result in hard quota violations from completing successfully. Alternatively, the storage system can wait until the quota has been violated before denying the data access request. In another embodiment, a grace interval may be used to allow a user to temporarily violate their quotas (e.g., hard quota) by certain amounts if necessary. The user is typically notified through the failed data access request (e.g., failed write data access request) with an error message generated by the violating applications, while the administrator may also receive a notification of the violation as well.

The execution of the system rules can be enabled by an access quota enabler. The access quota enabler can perform access quota actions to deny access, throttle the user's access, generate an audit alert, delete a file after specified number of data access requests (e.g., one read triggers the file to be deleted), or the like.

Storage Node Network Environment

FIG. 1 shows a network environment in which the invention can be implemented. A node 2 (e.g., storage server) is coupled locally to storage devices 4, which includes multiple storage devices (e.g., disks). In one embodiment, the node 2 is a storage server. Alternatively, the node 2 is another type of server, such as a client-based server. The node 2 is also coupled through a network 3 to a number of storage clients 1 (hereinafter simply "clients"). The storage devices 4 are managed by the storage server 2. The storage server 2 receives and responds to various read and write requests from the clients 1, relating to volumes, directories, logical unit numbers (LUNs), files, blocks and/or other units of data stored in (or to be stored in) the storage devices 4.

In one embodiment, a user interface implemented on a management console 8, may be provided to allow an administrator to access the storage server 2. The user interface may be implemented on a computer, such as the management console 8 that is connected to the storage system, and may be, for example, a command line interface (CLI) and/or a graphical user interface (GUI).

The node 2 may be a processing system that is configured to store and retrieve data on behalf of one or more client processing systems, such as the clients 1. In the context of NAS, the storage server may be a file server. In one embodiment, the node 2 is a storage server, made by Network Appliance, Inc. of Sunnyvale, Calif. In a SAN context, the storage server provides clients with block-level access to stored data, rather than file-level access. Some storage servers are capable of providing clients with both file-level access and block-level access, such as certain storage servers made by Network Appliance, Inc. of Sunnyvale, Calif.

Each of the clients 1 may be, for example, a conventional personal computer (PC), workstation, or the like. The clients 1 may be general-purpose computers configured to execute software applications. Each client 1 may communicate with the nodes over the network 3 by exchanging data according to pre-defined protocols, such as Transmission Control Protocol/Internet Protocol (TCP/IP). Moreover, the client 1 may interact with the nodes in accordance with a client/server model of information delivery. That is, the client may request the services of the node, and the system may return the results of the services requested by the client, by exchanging data over the network 3. The clients 1 may issue commands and data using file-based access protocols, such as the Common Internet File System (CIFS) protocol or Network File System (NFS) protocol, over TCP/IP when accessing information in the form of files and directories. Alternatively, the client may issue commands and data using block-based access protocols, such as the Small Computer Systems Interface (SCSI) protocol encapsulated over TCP (iSCSI) and SCSI encapsulated over Fibre Channel Protocol (FCP), when accessing information in the form of blocks.

In one embodiment, the node 2 is a storage server used in a NAS mode. In another embodiment, the node 2 is, a block-based storage server such as used in a SAN. In another embodiment, the node 2 is a storage server which can perform both file-level access and block-level access for clients. Alternatively, the node 2 may be another type of server in a cluster or non-cluster configuration. The network 3 may be, for example, a local area network (LAN), a metropolitan area network (MAN), a wide area network (WAN), a global area network (GAN) such as the Internet, or other type of network or combination of networks. The network 3 may implement, for example, Ethernet protocol, Fibre Channel protocol, or another protocol or a combination of protocols.

Figure 3:
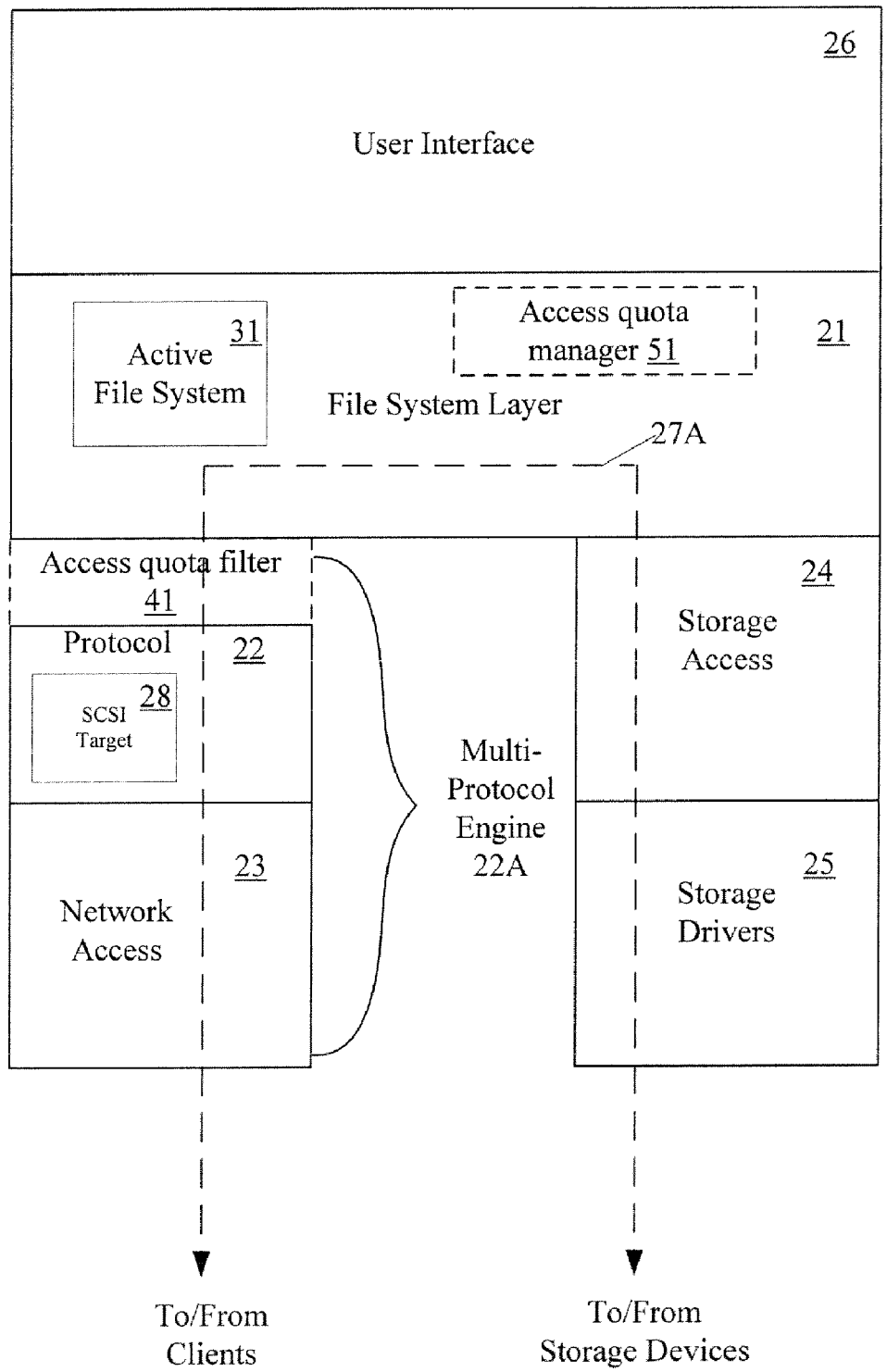
FIG. 3 illustrates one embodiment of the architecture of the operating system of the storage server of FIG. 2.

The storage devices 4 may store data represented in an active file system of the storage server 2. The active file system is a hierarchy of the stored data sets and includes directories and files to which read and write requests can be made. The file system layer 21, illustrated in FIG. 3, is an application-level programmatic entity or layer which imposes the hierarchal structure on the data sets, such as the files, directories and/or other data containers stored and/or managed by a storage server, and which services read and write requests from clients of the storage server. The storage devices in the storage devices 4 may be, for example, conventional magnetic disks, optical disks such as CD-ROM or DVD based storage, magneto-optical (MO) storage, or any other type of non-volatile storage devices suitable for storing large quantities of data. The storage devices in the storage devices 4 can be organized as one or more RAID groups, in which case the node 2 accesses the storage devices 4 using an appropriate RAID protocol.

Storage of information can be implemented as one or more storage "volumes", such as volume 6A and volume 6B of node 2, each of which includes a set of one or more physical disks managed cooperatively to define an overall logical arrangement of disk space on the volume(s). Alternatively, the storage of information may be implemented in other configurations other than volumes. A volume is a logical data set which is an abstraction of physical storage, combining one or more physical storage devices or parts thereof into a single logical storage object (e.g., data storage unit), and which is managed as a single administrative unit, such as single file system. Typically, file systems have a one to one mapping to volumes where volumes can be constructed from one or more storage devices (e.g., disks). Typically, a volume management layer, which is separate from the file system layer, handles the arrangement of storage devices and provides the appearance that a single volume exists to the file system layer. Each volume is generally, although not necessarily, managed as a separate file system. Each volume stores a copy of a data set, and each node has its own data sets as well as has access to the other node's data sets. It should be understood that while only two nodes are shown in the illustrative cluster configuration, it is expressly contemplated that any other number of nodes and volumes may be connected in a cluster or non-cluster configuration. It should also be noted that although the volumes 6A and 6B and aggregate 7 are illustrated in the storage server 2 of FIG. 1, the volumes 6A and 6B and aggregate 7 are presented on the storage server, while the content of the volumes 6A and 6B and aggregate 7 reside on the storage devices 4.

Figure 2:
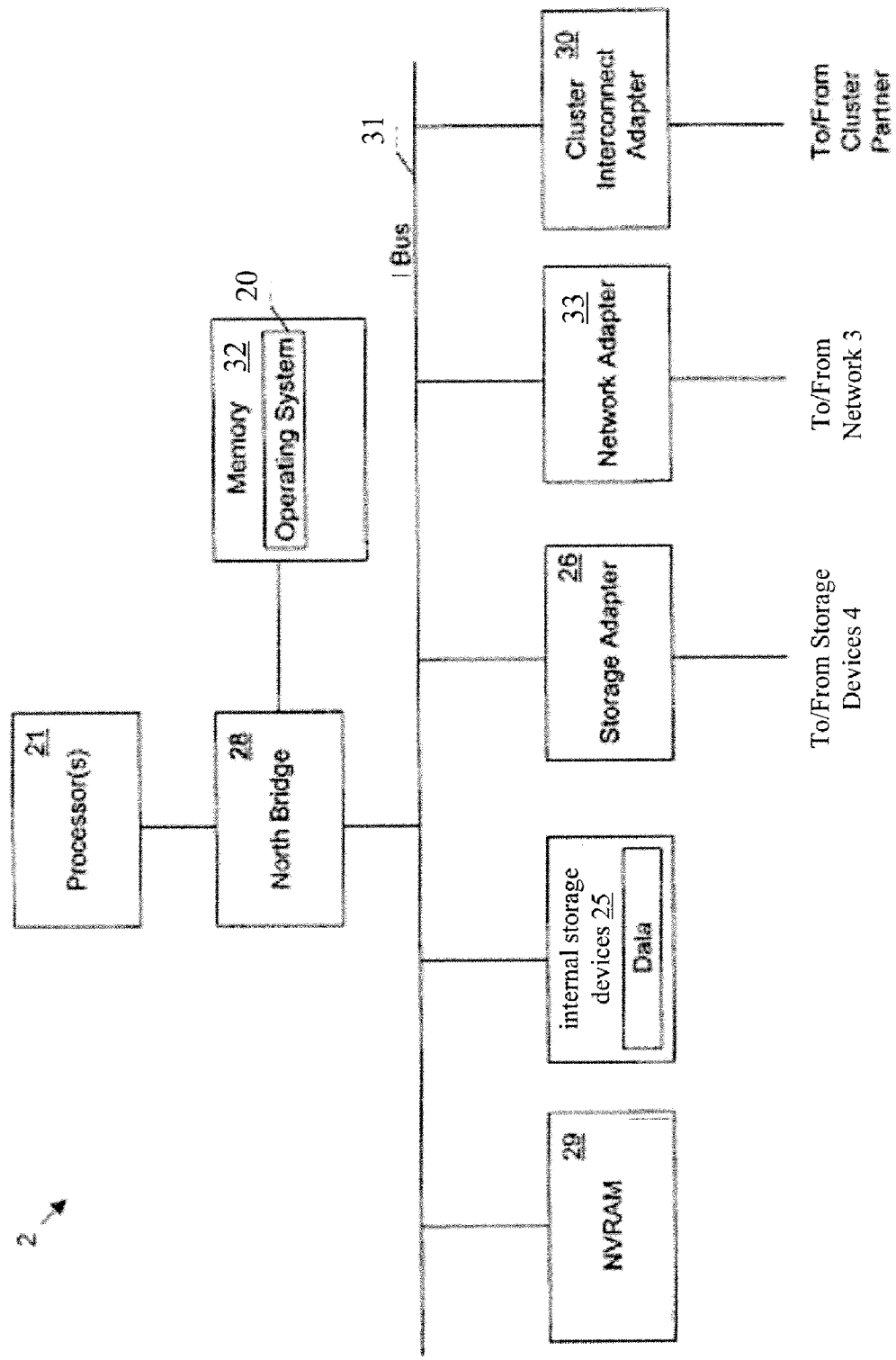
FIG. 2 illustrates a block diagram of one embodiment of the architecture of a storage server.

FIG. 2 illustrates a block diagram of one embodiment of the architecture of a storage server 2. The storage server 2 includes one or more processors 21 and a system memory 32 coupled to each other by a north bridge 28. The north bridge 28 is also coupled to a bus 31 (e.g., Peripheral Component Interconnect (PCI) bus). The north bridge 28 provides an interface between peripheral components on the bus and the processors 21 and system memory 32.

Each processor 21 is a central processing unit (CPU) of the storage server 2 and, thus, controls the overall operation of the storage server 2. In certain embodiments, a processor 21 accomplishes this by executing software stored in system memory 32. Such software may include the operating system 20 of the storage server 2. Each processor 21 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices. The system memory 32 is a random access memory (RAM) which stores, among other things, the operating system 20 of the storage server 2, in which the techniques introduced herein can be implemented.

Connected to the bus 31 are a non-volatile memory 29 (e.g., NVRAM 29), which stores the non-volatile data of the storage server 2 (e.g., storage server and associated storage devices); one or more internal storage devices 25; a storage adapter 26; a network adapter 33; and a cluster interconnect adapter 30. The NVRAM 29 is configured to store information about the storage server and associated storage devices, such as, for example, a record of write requests received from clients since the last consistency point may be stored in NVRAM.

Internal storage devices 25 may be or include any conventional medium for storing large volumes of data in a non-volatile manner, such as one or more disks. The storage adapter 26 allows the storage server 2 to access the external storage devices 4 and may be, for example, a Fibre Channel adapter, a SCSI adapter, or the like. The network adapter 33 provides the storage server 2 with the ability to communicate with remote devices such as the clients 1 over a network and may be, for example, an Ethernet adapter, or the like. The cluster interconnect adapter 30 provides the storage server 2 with the ability to communicate with its cluster partner (e.g., another storage server).

FIG. 3 shows one embodiment of the architecture of the operating system of the storage server 2 of FIG. 2. As shown, the operating system 20 includes several software modules, or "layers". These layers include a file system layer 21. The file system layer 21 is an application-level layer which imposes a structure, e.g. a hierarchy, on files and directories and/or other data containers stored by the storage server 2 and which services read/write requests from clients 1, among other functions. This hierarchy is referred to as the "active file system" 31. Logically "under" the file system layer 21, the operating system 20 also includes a protocol layer 22 and an associated network access layer 23 to allow the storage server 2 to communicate over the network 3 (e.g., with clients 1). The protocol layer 22 implements various higher-level network protocols, such as NFS, CIFS, Hypertext Transfer Protocol (HTTP), Fibre Channel Protocol (FCP), Internet SCSI (iSCSI), and/or other Upper Layer Protocols (ULP). In addition, assuming the storage server 2 is configured to operate in a SAN, the protocol layer 22 can also include a SCSI target layer 28, to enable the storage server 2 to receive and respond to SCSI I/O operations (i.e., read and writes). For block level access, the protocol layer 22 may be split in half where the bottom half represents the transport protocols iSCSI and FCP, and the top half is the common SCI target layer. The network access layer 23 includes one or more drivers which implement one or more lower-level protocols to communicate over the network, such as Ethernet, or TCP/IP. The network access layer may include TCP/IP stack as well as the lower level data link layer which includes the physical interfaces like Ethernet, a host bus adapter (HBA) which may provide a Fibre Channel interface, or the network adapter 33. The protocol layer 22 and the network access layer 23 can be collectively referred to as a multi-protocol engine 22A.

Also logically under the file system layer 21, the operating system 20 includes a storage access layer 24 and an associated storage driver layer 25, to allow the storage server 2 to communicate with the storage devices 4. The storage access layer 24 implements a higher-level disk storage protocol, such as an implementation of RAID, while the storage driver layer 25 implements a lower-level storage device access protocol, such as Fibre Channel Protocol (FCP) or small computer system interface (SCSI). Also shown in FIG. 3 is the path 27A of data flow, through the operating system 20, associated with read or write data access requests of the attached storage devices.

The operating system 20 also includes a user interface layer 26 logically on top of the file system layer 21. The user interface layer 26 may provide a command line interface (CLI) and/or a graphical user interface (GUI) to various storage server functions, to allow an administrator to manage the storage server 2. For example, the user interface layer 26 is coupled to the management console 8 to provide a user interface to an administrator on the management console 8.

The storage server 2 has an active file system 31, which is created and managed by the file system layer 21 of the operating system 20. It should be noted that although node 2 is described and illustrated as a storage server in FIGS. 2 and 3, alternatively, other types of nodes in a cluster or non-cluster configuration may be used, such as client-based servers that are coupled to associated resources.

Access Quota

As described above, the embodiments described herein limit a user's access to data of the storage system based on an access quota. The access quota is defined according to an access quota policy, and is configured to limit a user or a group of users to a defined amount (e.g., quota) or a defined frequency of access to storage resources, such as the amount of access to particular directories or files, particular volumes, particular disk space, or the like. The defined amount may be the amount of data access requests for a given time period.

As described in more detail below, the embodiments described herein may prevent lower-priority users from over-utilizing system resources to the detriment of other higher-priority users. Also, the embodiments may preempt suspected read data access requests of confidential information by a user that should not be privy to the confidential information. In addition, the embodiments described herein may also be used to generate smart audit alerts or perform confidential read data access requests.

Figure 4:
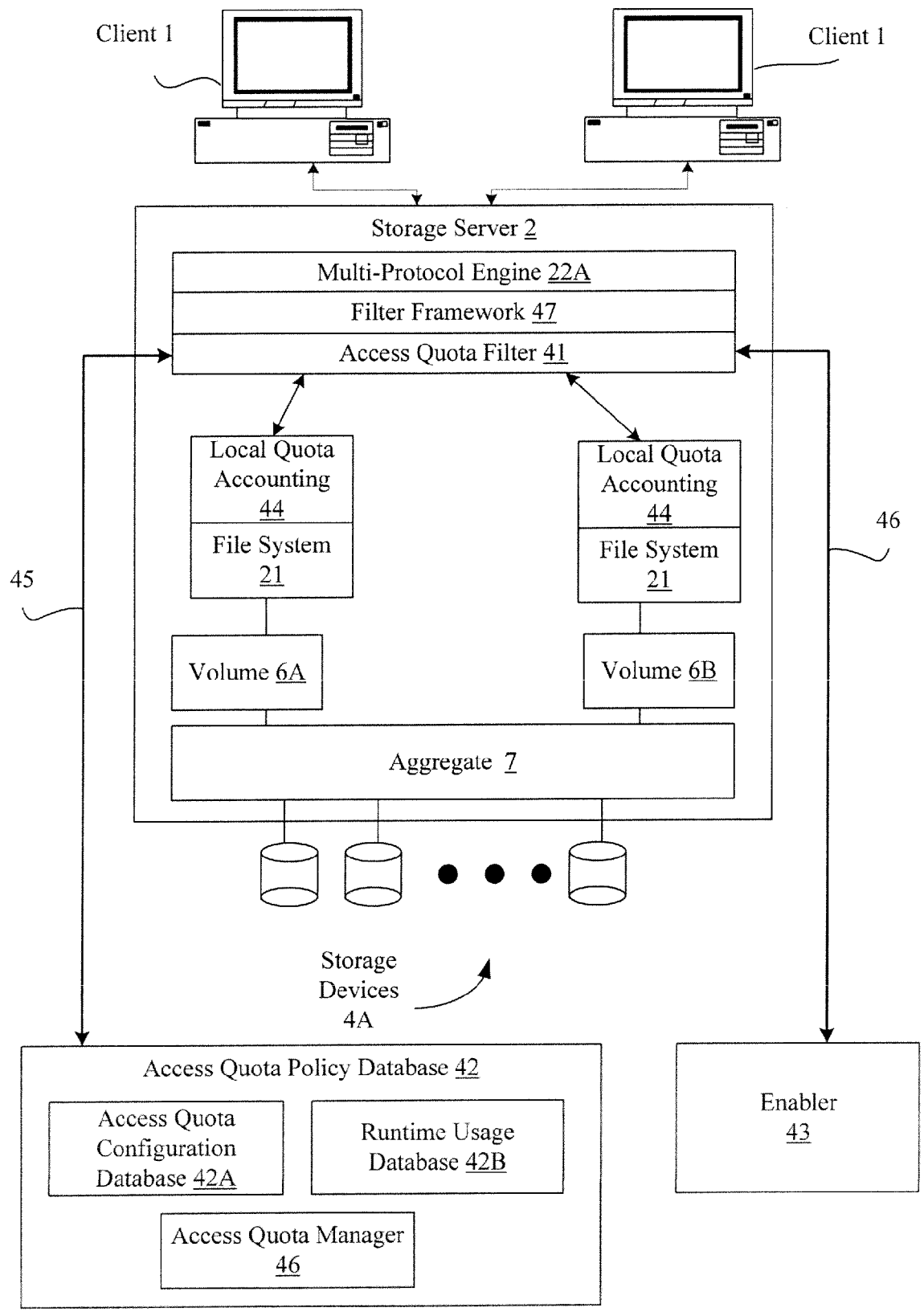
FIG. 4 illustrates a block diagram of one embodiment of a node implementing access quota management using an access quota filter.

FIG. 4 illustrates a block diagram of one embodiment of the node 2 implementing access quota management using an access quota filter 41. In this embodiment, the node 2 is a storage server that implements an access quota. That is, the storage server 2, by way of the access quota filter 41, operates as an access quota manager in coordination with an access quota policy database 42 and an enabler 43. In this embodiment, the access quota management is implemented using an access quota filter 41 that is disposed in the data path of the node 2. The access quota filter 41 can access both the access quota policy database 42 and the enabler 43.

In one embodiment, the access quota policy database 42 is implemented in an access quota database manager and includes an access quota configuration database 42A and runtime usage database 42B (e.g., an access quota database). The runtime usage database 42B stores entries of runtime usage for one or more users or groups of users, and the access quota configuration database 42A stores entries of the quota limits for one or more users or groups of users. The runtime usage database 42B and the access quota configuration database 42A may be stored as separate database, or alternatively, as a single database. The access quota database manager may include an access quota manger 46 which is executed on one or more processors and stored in system memory (not illustrated). Although the one or more processors and system memory are not illustrated in FIG. 4, the one or more processors execute software stored in system memory, as known to those of ordinary skill in the art. It should be noted that although the embodiments described herein are described as implementing the access quota in an access quota configuration database 42A and a runtime usage database 42B that are managed by an access quota database manager, the access quota (access quota configuration and runtime usage) may also be implemented in other types of data stores as known to those of ordinary skill in the art.

The access quota database manager may be a storage server, as described with respect to FIGS. 1-3, or alternatively, the access quota database manager may be another type of server that manages the runtime usage database and the access quota configuration database. In one embodiment, the access quota database manager is implemented on the client 1. In another embodiment, the access quota database manager is a server implementing the Data ONTAP® GX operating system, available from Network Appliance of Sunnyvale, Calif., to implement a relational database (RDB), which stores both the access patterns by the user, the access quotas of storage resources for the storage system, and the system rules that are triggered when the access quotas are met or exceeded. Alternatively, other types of devices may be used. The access policy database 42 also includes a quota manager 46 which is executed on one or more processors and stored in system memory (not illustrated). Although the one or more processors and system memory are not illustrated in FIG. 4, the one or more processors execute software stored in system memory, as known to those of ordinary skill in the art. The access quota policy database 42 may be implemented on a storage server, such as the storage server 2 as described with respect to FIGS. 1-3. Alternatively, the access quota policy database 42 may be implemented on another type of server that manages the quota database 42 and quota configuration database 43. It should be noted that the access pattern may be determined by the access quota manager 46 and stored in the access quota database 42. The quota manager 46 may also manage the access quota policy as stored in the access quota configuration database 43. Alternatively, the access quota filter can determine the access pattern.

In another embodiment, the enabler 43 is implemented on the database manager (e.g., storage server or other type of server) that manages the access quota policy database 42. Alternatively, the enabler 43 may be implemented on a separate node from the access quota policy database 42.

The runtime usage database 42B may be an accounting database that stores all access patterns for a user or a group of users over the designated storage set, such as a designated volume set or directory set. The access quota configuration database 42A may include information such as the defined access quota for one or more users. The access quota configuration database 42A may also store additional information regarding the access quota configuration, such as an access quota policy that includes quota definitions for one or more users of the storage system. The access quota configuration database 42A may also store the user identity (e.g., user ID, group ID), total number of data access requests per the defined time period, destination (e.g., directory ID, volume ID, or combination of directory IDs and volume IDs), time period (e.g., minutes or hours), a time parameter (e.g., time to decide the valid range that the quota applies), a wrap-up parameter, which indicates whether after period is expired, the number of data access requests should be recorded or discarded, hard and soft quotas, a quota leniency rate (e.g., available storage above soft quota, for example, 10%, before reaching the hard quota), a violation tolerance parameter, which indicates how many time the user can exceed the access quota before hard quota is enabled, a growth rate, which allows a user to use more storage resources over time (e.g., 1% per month increase in quota), access quota action, which is the action generated by soft quota or hard quota, or the like.

The node 2 can access the runtime usage database 42B via the access quota filter 41, for example. The access quota filter 41 communicates with the access quota database manager storing the access quota policy database 42 by an interconnect line 45 and to the enabler 43 by interconnect line 46. The interconnect line 45 may be, for example, Ethernet, Remote Direct Memory Access (RDMA), FCP, 802.11B, or the like. In one embodiment, the access quota filter 41 sits in the data path of the node 2, such as illustrated in FIGS. 3 and 4, and can determine the access patterns based on monitoring data access requests to check for quota-sensitive data access requests. In another embodiment, the access quota filter 41 can determine the access patterns for multiple volumes on the storage server 2, such as illustrated in FIG. 4.

The storage server 2 receives data access requests from one or more clients 1 via protocol layer 22, as described above. These data access requests are monitored to check for quota-sensitive data access requests by the access quota filter 41. The quota-sensitive data access requests may be, for example, creating a new file, reading an existing file, deleting an existing file, or writing to an existing file to append the data of the existing file. Based on the monitoring, the access quota filter 41 determines an access pattern for a user during a period of time. For example, the access quota filter 41 determines a number of data access requests to storage resources by the user during a period of time. The access pattern may be based on data access requests to data on a specific storage set, such as a volume (e.g., volume 6A). Alternatively, the access pattern may be based on data access requests to other storage sets, such as volume set, including volume 6A and 6B, a directory set, an aggregate 7, or the like.

The access quota filter 41 checks the access quota policy database 42 to compare the access pattern of the user against the access quota. In one embodiment, the access quota policy database 42 includes access attributes for each user. These access attributes may be, for example, a group, a type of group, an access priority, level of security access to sensitive or classified information, or the like. The access quota policy database 42 may also include policy parameters. These policy parameters may be, for example, the number of data access requests allowed for a particular user, for a particular type of user, or for a particular access priority, a time interval or period, or the number of operations allowed for a particular user. Alternatively, the policy parameters may include additional information, such as information on the users, the clients, the volumes, and the systems.

In one embodiment, the access quota policy database 42 is implemented as a Boolean expression of policy parameters and/or access attributes, such as those described above. In one embodiment, the access quota policy database 42 includes a directory listing policy, which defines an access quota of a number of data access requests per a specified time period and a system rule that results in future throttling of data access requests for the given user for a specified period of time. For example, a user from a remote group that performs a directory listing more than 3 times per second, may result in future throttling of data access requests for the given user for 10 minutes.

The access quota policy database 42 may be stored remotely on a node, such as a access quota database manager that manages an access quota policy database 42, or alternatively, on an additional storage server. In another embodiment, the access quota policy database 42 is stored in an access policy manager. Alternatively, the access quota policy database 42 may be stored locally on the storage server 2. In one embodiment, the access quota policy database 42 includes an access quota that defines a number of data access requests allowable for the user. If the access pattern violates the access quota, such as by the number of data access requests by the user being greater than the number of data access requests allowed according to the access quota, a system rule, also referred to as access quota actions, can be executed, such as denying access for the particular data access request that violates the access quota policy. The access quota policy database 42 may also store access quota actions that correspond to certain types of access quota violations.

In one embodiment, the access quota configuration database 42A of the access quota policy database 42 includes entries, such as the exemplary entries described in Table 1-1, and the runtime usage database 42B of the access quota policy database 42 includes entries, such as the exemplary entries described in Table 1-2. It should be noted that the access quota configuration database 42A and the runtime usage database 42B may be implemented in a single database or in separate databases. The access quota configuration database 42A includes entries that include an identifier and policy limits corresponding to the identifier. The identifier may include a type of identifier (e.g., user, group, or directory), the name of the identifier (e.g., User A, Human Resources (HR), dir2), and the scope of the identifier (e.g., /cluster_a, /cluster_b/dir1, or /cluster_c/dir1). Alternatively, other types of identifiers may be used to identify the entity for access quota configuration. The policy limits may include limits, such as number of data access requests, a time interval (e.g. in seconds), number of operations, number of users, number of clients, or the like, such as in the exemplary entries described in Table 1-1. Alternatively, the access quota configuration database 42A may store more or less information as described in Table 1-1.

TABLE 1-1

Access Quota Configuration Database 42A

| Identifier | | | Policy (Limits) | | | |
|---|---|---|---|---|---|---|
| Type | Name | Scope | Number of data access requests | Time Interval (seconds) | Number of Operations | Number of Users/ Number of Clients |
| User | User A | /cluster_a | 10 | — | — | — |
| Group | HR | /cluster_b/dir1 | — | 60 | — | — |
| Directory | dir2 | /cluster_c/dir1 | — | — | 100 | — |

The runtime usage database 42B includes entries that include an identifier and the runtime usage. The identifier may include a type of identifier (e.g., user, group, or directory), the name of the identifier (e.g., User A, Human Resources (HR), dir2), and the scope of the identifier (e.g., /cluster_a, /cluster_b/dir1, or /cluster_c/dir1). Alternatively, other types of identifiers may be used to identify the entity for access runtime usages. The runtime usage database 42B may include the number of data access requests, the time interval (e.g., in seconds), number of operations, number of users, number of clients, or the like, such as in the exemplary entries described in Table 1-2. Alternatively, the runtime usage database 42B may store more or less information as described in the exemplary entries of Table 1-2.

TABLE 1-2

Runtime Usage Database 42B

| Identifer | | | Runtime Usage | | | |
|---|---|---|---|---|---|---|
| Type | Name | Scope | Number of data access requests | Time Interval (seconds) | Number of Operations | Number of Users/ Number of Clients |
| User | User A | /cluster_a | 5 | — | — | — |
| Group | HR | /cluster_b/dir1 | — | 144723437 | — | — |
| Directory | dir2 | /cluster_c/dir1 | — | — | 56 | — |

In another embodiment, the runtime usage database 42B and the access quota configuration database 42A of the access quota policy database 42 are stored locally on the storage server 2.

Figure 5:
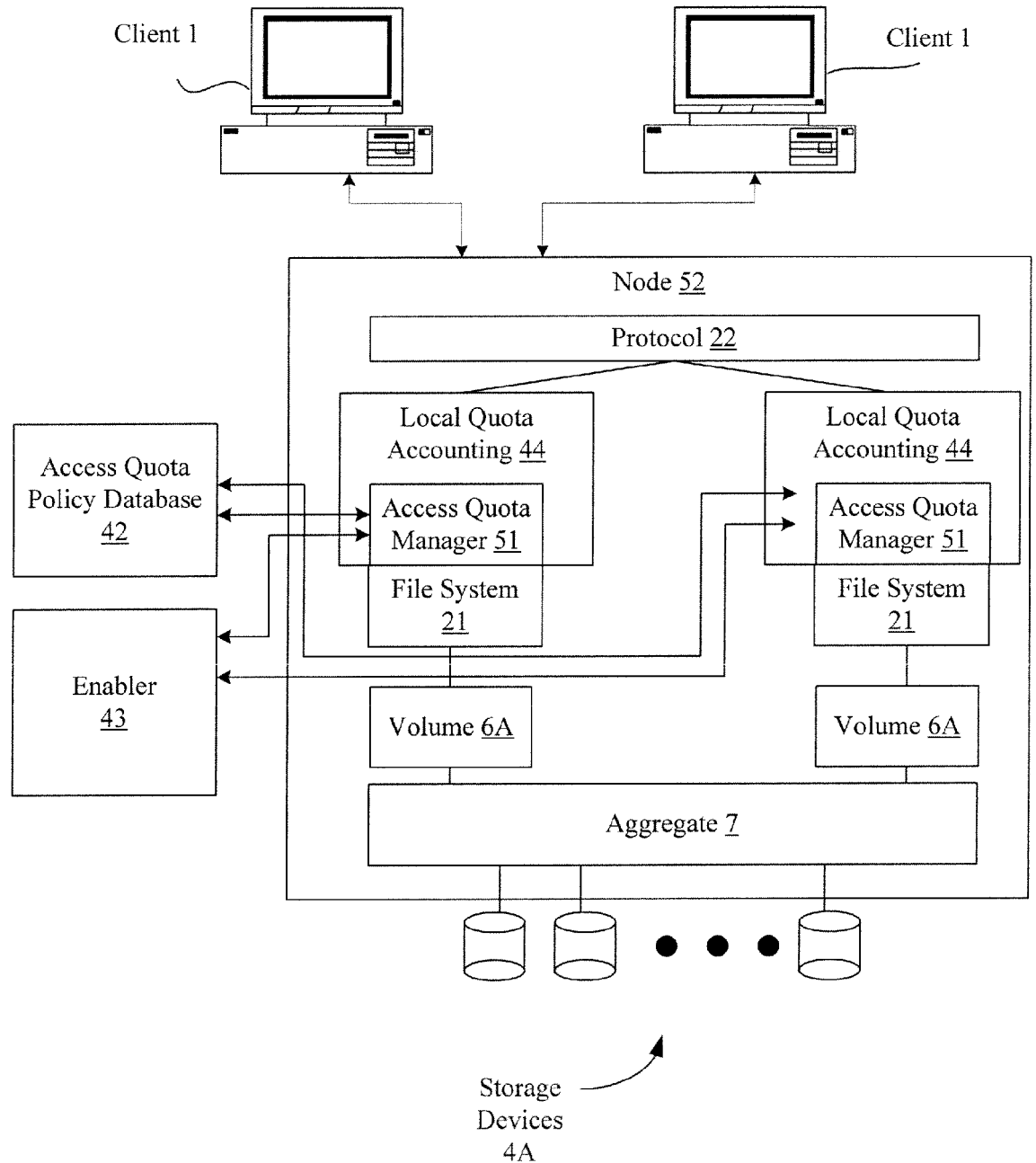
FIG. 5 illustrates a block diagram of one embodiment of a node implementing access quota management using individual access quota management in each file system residing on the node.

The node 2 can access the access quota policy database 42 via the access quota filter 41 and corresponding filter framework 47, for example. The access quota filter 41 communicates with the access quota policy database manager storing the access quota policy database 42 by an interconnect line 45 and to the enabler 43 by interconnect line 46. The interconnect line 45 may be, for example, Ethernet, Remote Direct Memory Access (RDMA), FCP, 802.11B, or the like. In one embodiment, the access quota filter 41, which sits in the data path of the node 2 between the multi-protocol engine 22A and the file system layer 21, such as illustrated in FIGS. 3 and 4, monitors data access requests to check for quota-sensitive data access requests, and determines the access patterns based on monitoring. In another embodiment, the access quota filter 41 can determine the access patterns for multiple volumes on the storage server 2, such as illustrated in FIG. 4. Alternatively, the access quota management operations may be implemented in the local quota accounting system 44 that determines the local volume accounting of the user on the volume (e.g., volume 6A) associated with the file system layer 21, as illustrated in FIG. 5.

As described above, once the access pattern has been determined by the access quota filter 41, the access pattern is compared against an access quota, which is defined by an access quota policy database 42, by consulting the access quota policy database 42. As describe above, the access quota policy may include an access quota configuration database 42A and a runtime usage database 42B, managed by an access quota manager. The access quota may include a limit on access to a storage area, or a limit on a number of data access requests allowable by the user during a time period. In one embodiment, the access quota includes a limit on access to a storage area that is designated as having sensitive data based on an access priority of the user. For example, if the user has a lower access priority than the allowed priority access for the storage area, and the user attempts to access the storage area, the storage server can limit the user's access to the storage area since the user's access pattern violates the access quota for the particular storage area. Access may be limited by denying access, delaying access, or deleting the sensitive data after the user has read the sensitive data a predefined number of times. In another embodiment, the access quota includes a soft-quota definition, which defined a limit on the access and defines a system rule that generates a warning, indicating that the user has exceeded the access quota. The system rule indicates an action that is to be performed in response to the violation of the access quota policy database 42. The system rule can be stored in memory of the storage server, or alternatively, in memory of the access quota database manager. In another embodiment, the access quota includes a hard-quota definition, which defines a limit on the access and defines a system rule that prevents the quota-sensitive data access request that would exceed the access quota. The system rule indicates an action that is to be performed in response to the violation of the access quota policy.

In one embodiment, the storage server 2 limits the user's access by using the enabler 43. When the user has violated the access quota (e.g., the access quota has been met or exceeded), the storage server limits the user's access to storage resources according to an access quota action, as defined in the access quota policy database 42. Limiting the user's access may be done by the enabler 43. The enabler 43 enables the execution of access quota actions or system rules to limit the user's access when the user has violated the access quota policy database 42. The enabler 43 invokes action based the quota configuration and the quota check status. In one embodiment, once the storage server determines that the access pattern of the user has violated the access quota, the enabler 43 enables a system rule to be executed. In one embodiment, the system rule includes denying access to data, or a portion thereof, of the storage system by the user. In another embodiment, the system rule includes delaying access to the data, or a portion thereof, of the storage system by the user. Delaying access may be done by using a system-provided queue to delay access to the data by the user. Alternatively, other mechanisms may be used to delay access, such as lowering an access priority of the user. The access priority of the user may be lowered for a predefined period of time or indefinitely. For a soft quota configuration, the action enabled by the enabler 43 may be sending an alert, email, log, or audit the violation. For a hard quota configuration, the action enabled by the enabler 43 may be to deny access for a certain time within certain error code like "not enough quota," need to retry," or "short of storage resources," give access error for certain time, or put the request into lower priority mode for a certain time, as described herein.

In one embodiment, the enabler 43 is implemented in a node that is external to the storage server 2, as illustrated in FIG. 4. In another embodiment, the enabler 43 is implemented in connection with the access quota filter 41 in the storage server 2. Alternatively, the enabler 43 may be implemented in other configurations, for example, in a database manager that manages the access quota policy database 42 or in another node that is accessible by the access quota filter 41 by interconnect line 46.

Executing a system rule in response to an access quota policy database 42, as described above, may be used to prevent lower-priority users from over-utilizing system resources to the detriment of other higher-priority users. In another embodiment, the access quota policy database 42 defines an access quota that specifies the allowed access to certain data that contains confidential information and a system rule that preempts a suspected read data access request of the confidential information by a user that violates the access quota. In another embodiment, the access quota policy database 42 defines an access quota that triggers a system rule that generates a "smart" audit alert. A smart audit alert is generated by the enabler 43 based on the quota configuration, and record indicating what has happened. Usually this occurs when the soft quota is reached, and the corresponding action includes performing an audit. In another embodiment, the access quota policy database 42 defines an access quota that specifies the allowed access to certain data that contains confidential information and a system rule that deletes the confidential information after the confidential information has been read by the user. In another embodiment, the system rule is executed to allow access from certain users to be trace free. In some embodiments, the quota configuration is defined to have a trace free action for certain users so that when the user's data access request violates the soft quota, the action is trace free. Alternatively, the access quota policy database 42 may define other types of access quotas that trigger similar or dissimilar types of system rules.

In one embodiment, the user can be limited to an access quota of storage resources across the multiple nodes (e.g., storage servers). In another embodiment, the user can be limited to an access quota of storage resources residing on a single node (e.g., storage server. The user may also be limited to an access quota based on a volume set having multiple volumes on one or more nodes. Alternatively, the user may be limited to an access quota based on a directory set having multiple directories on one or more nodes.

FIG. 5 illustrates a block diagram of one embodiment of a node 52 implementing access quota management using individual access quota managers in each file system residing on the node. The node 52 of FIG. 5 is a storage server that implements an access quota. The storage server 52 of FIG. 5 is similar to the node 2 of FIG. 4, except, instead of using an access quota filter as part of the protocol layer, an access quota manager 51 is used. The access quota manager 51 is part of the file system layer 21, as illustrated in FIGS. 3 and 5. The access quota manager 51 operates in coordination with the access quota policy database 42 and the enabler 43, as described above. Like the access quota filter 41, the access quota manager 51 is configured to monitor data access requests to the volume 6A and determine the access patterns based on the monitoring. The access quota manager 51 monitors data access requests to check for quota-sensitive data access requests, such as creating a new file, reading an existing file, deleting an existing file, or writing to an existing file to append the data of the existing file, as described above.

The storage server 2 receives data access requests from one or more clients 1 via protocol layer 22, and the data access requests undergo a protocol conversion into a system internal request, as described above. The internal requests are monitored by the access quota manager 51 to check for quota-sensitive data access requests, and the access quota manager determines an access pattern for the user, for example, a number of data access requests to storage resources during a period of time. The access pattern may be based on data access requests to data of volume 6A. Alternatively, the access pattern may be based on data access requests to other storage sets, such as the aggregate 7, or the like.

The access quota manager 51 checks the access quota policy database 42 to compare the access pattern of the user against the access quota. As described above, the access quota policy database 42 may includes access attributes for each user, such as, for example, a group, a type of group, an access priority, level of security access to sensitive or classified information, or the like. The access quota policy database 42 may also include policy parameters, such as, for example, the number of data access requests allowed for a particular user, for a particular type of user, or for a particular access priority, a time interval or period, or the number of data access requests allowed for a particular user, for a particular type of user, or for a particular access priority. Alternatively, the policy parameters may include additional information, such as information on the users, the clients, the volumes, and the systems. Although not illustrated in FIG. 5, the access quota policy database 42 may also include the access quota configuration database 42A and runtime usage database 42B as described with respect to FIG. 4.

Once the access pattern has been determined by the access quota manager 51, the access pattern is compared against an access quota, which is defined by an access quota policy database 42, by consulting the access quota policy database 42. The access quota may include a limit on access to a storage area, or a limit on a number of data access requests allowable by the user during a time period. In one embodiment, the access quota includes a limit on access to a storage area that is designated as having sensitive data based on an access priority of the user. For example, if the user has a lower access priority than the allowed priority access for the storage area, and the user attempts to access the storage area, the storage server can limit the user's access to the storage area since the user's access pattern violates the access quota for the particular storage area. Access may be limited by denying access, delaying access, or deleting the sensitive data after the user has read the sensitive data a predefined number of times. In another embodiment, the access quota includes a soft-quota definition, which defined a limit on the access and defines a system rule that generates a warning, indicating that the user has exceeded the access quota. In another embodiment, the access quota includes a hard-quota definition, which defines a limit on the access and defines a system rule that prevents the quota-sensitive data access request that would exceed the access quota.

In one embodiment, the storage server 2 limits the user's access using the enabler 43. As described above, enabler enables the execution of system rules in response to the access quota policy being met or exceeded. When the user has violated the access quota (e.g., the access quota has been met or exceeded), the storage server limits the user's access to storage resources according to an access quota action, as defined in the access quota policy database 42. In one embodiment, the system rule includes denying access to data of the storage system by the user. In another embodiment, the system rule includes delaying access to the data of the storage system by the user. Delaying access to the data may be done by using a system-provided queue to delay access to the data by the user. Alternatively, other mechanisms may be used to delay access, such as lowering an access priority of the user. The access priority of the user may be lowered for a predefined period of time or indefinitely.

As described above, executing a system rule in response to an access quota policy database 42, may be used to prevent lower-priority users from over-utilizing system resources to the detriment of other higher-priority users, to restrict access to certain data that contains confidential information, to pre-empt a suspected read data access request of the confidential information by a user that violates the access quota, or to generate a smart audit alert, as described above.

In one embodiment, each access quota manager 51 of node 52 monitors the respective data access requests in the file system layers 21 to check for quota-sensitive data access requests. The quota-sensitive data access requests monitored by both access quota managers 51 are used together to determine access patterns to storage resources of the node 52, and not just the access patterns to a particular volume. For example, volume 6A and 6B may be part of a volume set, and, as such, the access quota managers 51 can determine the access pattern for the user over the volume set. Alternatively, other storage sets may be monitored in a similar fashion, such as directory sets, aggregates, or the like. In one embodiment, the results of the monitoring by the access quota managers 51 are stored in a database in an access quota database manager that is coupled to the node 52. The access quota database manager may also store the access quota policy database 42. The respective access quota managers 51 can check the access quota database manager to determine if the access pattern violates the access quota. If the access pattern does violate the access quota, the access quota manager 51, by way of the enabler 43, can enable the execution of a system rule that corresponds to the access quota that has been violated.

In one embodiment, the access quota manager 51 is managed based on local volume accounting of each of the volumes, as described above. Some file systems 31 include a local quota accounting system 44 that determines the local volume accounting of the user on the volume (e.g., volume 6A) associated with the file system layer 21. In these systems including local volume accounting, the access quota manager 51 can access the local quota accounting system 44 to determine the access pattern for the user. Each of the access quotas managers 51 can determine the access pattern for a particular volume (e.g., volume 6A and 6B) and check the access pattern against the access quota policy database 42, and enable execution of system rules triggered by violations of the access quota policy database 42 by way of enabler 43.

In one embodiment, as illustrated in FIG. 4, the access quota management is implemented as a protocol filter (e.g., access quota filter 41) between the protocol layer 22 and the file system layer 21. A protocol filter is one type of filter that intercepts the request in the multi-protocol engine 22A. In terms of layering, as describe herein, the protocol filter is between the client and protocol layer. This protocol filter may also be disposed between the protocol layer and the file system layer before the protocol has been translated to the file system request. Alternatively, the quota filter 41 may be implemented in other layers of the operating system to monitor the data access requests to check for quota-sensitive data access requests that affect the storage resources and to determine access patterns for the user. In another embodiment, the access quota is implemented as part of the protocol layer 22. In another embodiment, the access quota is implemented as part of the file system layer 21. In another embodiment, as illustrated in FIG. 5, the access quota manager 51 is implemented in the local quota accounting system 44 associated with the file system 31 managed by the file system layer 21.

In one embodiment, the logical data flow for implementing an access quota includes the administrator setting up (e.g., defining or modifying) the access quota for a user A for a storage set (e.g., a volume, a volume set, a directory, a directory set, an aggregate, or the like). For example, the access quota may be for volume 6A on node 52. Alternatively, the access quota may be for volumes 6A and 6B (e.g., of aggregate 7) on node 52. In other embodiments, the access quota is implemented over multiple nodes. After the access quota has been set up, the access quota manager 51 (or access quota filter 41) operates to monitor access patterns and to enforce system rules based on violation of the access quota based on the monitored access patterns.

Figure 6:
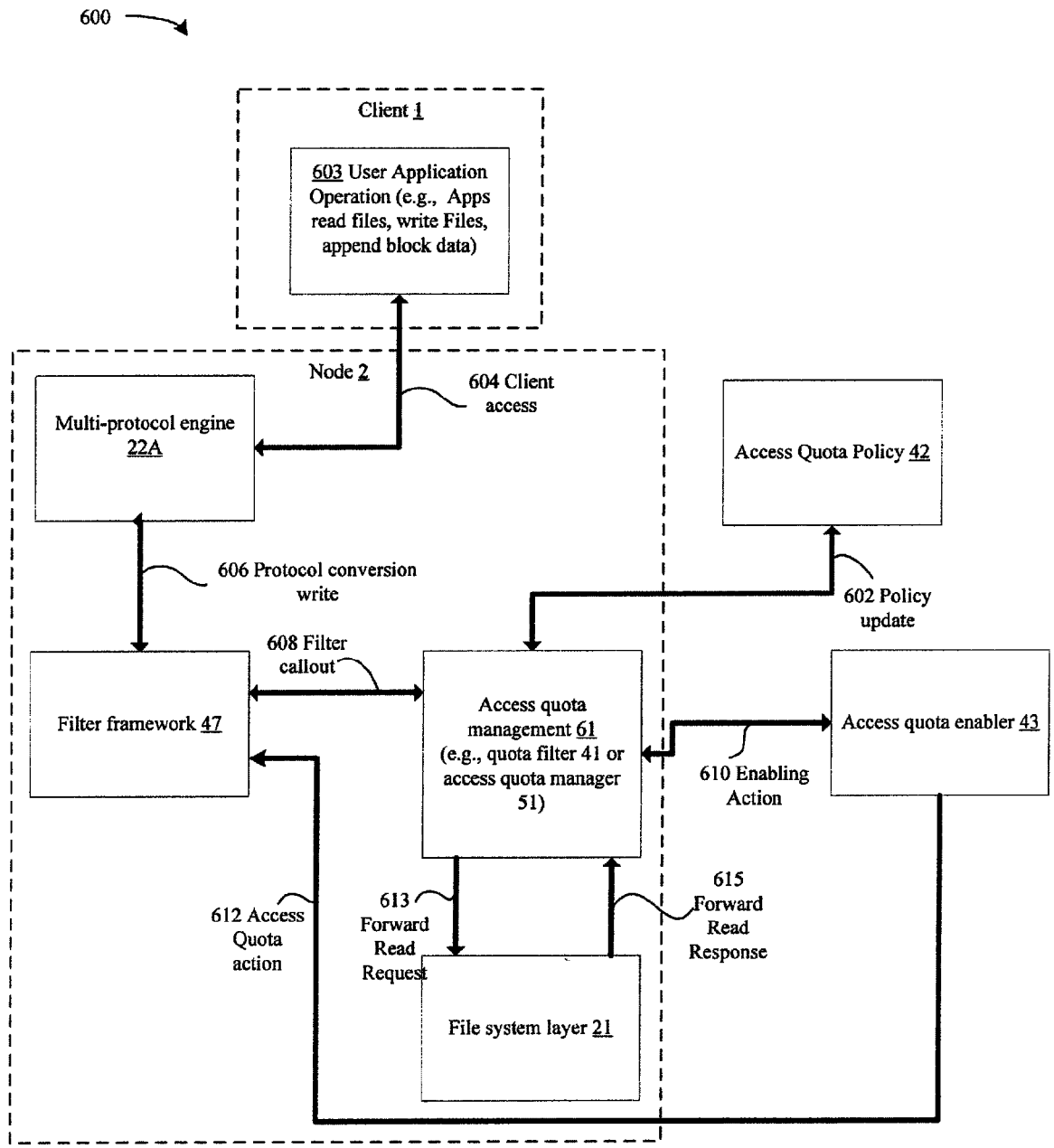
FIG. 6 illustrates one embodiment of a flow chart of a method of a read data access request processed by a storage system implementing access quota management.

FIG. 6 illustrates one embodiment of a flow chart of a method 600 of a read data access request processed by a storage system implementing access quota management. As part of the method 600, an access quota policy can be created and stored, such as in an access quota database manager or in memory of node 2 or node 52. In particular, an access quota configuration database 42A of the access quota database manager may store an access quota policy, which includes an access quota definition that defines the access quota for a particular user to storage resources of the storage system, for example, a volume quota, or a volume set quota. The access quota definition may include policy parameters, such as, for example, the number of data access requests allowed for a particular user, for a particular type of user, or for a particular access priority, a time interval or period, or the number of data access requests allowed for a particular user, for a particular type of user, or for a particular access priority. Alternatively, the policy parameters may include additional information, such as information on the users, the clients, the volumes, applications, and the systems. The particular types of data access requests may include read data access request, read directory data access request, open file data access request, read attribute data access request, write data access request, create file data access request, or the like. In another embodiment, the policy parameter includes information that identifies an access source, such as and IP address from which the client is accesses storage resources.

In another embodiment, the access quota policy has already been created and the administrator modifies the access quota policy to set the quota for the particular user and/or group of users.

As part of the access quota policy, certain policy enabler actions may be defined that define the system rules or access quota actions that are to be executed in response to violations of the access quota policy. The system rules may be, for example, a system rule to deny access, to throttle the user's access, to generate an alert, to delete a file after a certain number of data access requests, to enable or disable an audit, or the like.

In one embodiment, the access quota policy is a Boolean expression of policy parameters and/or access attributes, such as those described above, and the corresponding enabler actions. In one embodiment, the access quota policy database 42 includes a directory listing policy, which defines an access quota of a number of data access requests per a specified time period and a system rule that results in future throttling of data access requests for the given user for a specified period of time. For example, a user from a remote group that performs a directory listing more than 3 times per second, may result in future throttling of data access requests for the given user for 10 minutes.

Once the access quota policy has been created or modified and stored, the access quota policy is updated in the access quota management (e.g., access quota filter 41 or access quota managers 51) of the node 2 or 52, operation 602. A user-level program may load all, or a portion of, the access quota configuration database 42A and send it to the access quota management 61, for example, by a user-to-kernel level communication, such as through, for example, shared memory, driver system call (e.g., IO control (IOCTL) call), TCP socket call, remote procedure call (RPC), or the like.

Once the access quota management 61 has been updated with the access quota policy, a user or an application running on a client may attempt to perform a user-application operation, such as read file operation, write to file operation, append block data operation, or the like, which requires a client to access data (e.g., files) stored in the storage system, operation 603.

As described above, the storage system may include a storage server as the node 2 or node 52. In one embodiment, the storage server includes the multi-protocol engine 22A that services client accesses 604. The multi-protocol engine 22A receives client accesses 604, and in response performs protocol conversion of the client accesses corresponding to the read data access requests in operation 606. The client access 604 may be NFS or CIFS protocol requests, such as data access requests (e.g., a write access request) received over an Ethernet port or other types of network ports. The client sends the data access request to the multi-protocol engine 22A, according to the individual protocol specification. It should be noted that although the client access is described as being performed remotely over a network, alternatively, access can also be done locally.

As described above, the multi-protocol engine 22A receives the request from the client. Then the multi-protocol engine 22A parses the data access request, converts the request into a system internal request, and forwards the request to the filter framework 47. The filter framework 47 handles request and response calls to the access quota filters that are registered with the filter framework 47, as described in more detail below. On the return path, the multi-protocol engine 22A converts the internal response to a data access response via the designated protocol. The filter framework 47 receives the internal request from the protocol conversion. The filter framework 47 decides which call model is to be used. The call model may be synchronous, asynchronous, or sniff mode. In synchronous mode, the access quota management 61 (e.g., access quota filter 41 or access quota manager 51) holds the incoming data access request, blocks the calling thread until the work is completed on the data access request. In asynchronous mode, the access quota management holds the incoming data access request until the work is completed on the data access request, but releases the calling thread. In sniff mode, the access quota management does not block incoming data access requests or calling threads. The filter framework 47 can make a reference or copy of incoming data access request parameters.

The filter framework 47 may be implemented as an application that is "hooked into" or coupled to the storage server in one or more of a variety of locations. The locations for hooking the filter framework 47 include points in a data flow, such as at a client interface, a protocol interface, a network interface or a messaging interface for communicating with storage devices. The filter framework 47 provides a queue for each point at which the filter framework 47 is coupled to the storage server. The queues are maintained on a volume basis. The queues maintain filter call identifiers to enable filters to intercept data in the data path for the point at which the filter framework 47 is coupled to the storage server. A storage server controller is provided to capture request and responses for file system data and invoke applicable filters. The filter controller may invoke filters according to several different invocation models, including synchronous, asynchronous, and asynchronous release configurations.

The access quota filters associated with the filter framework 47 may be loaded or unloaded in the filter framework 47. The access quota filters 41 are arranged in a particular order for callback operations, based on, for example, priority. A callback represents instructions passed to a given filter for execution, often to call other procedures or functions. For example, a callback to the access quota filter may be in the form of a pointer to a function or procedure passed to the access quota filter. The access quota filter can produce I/O requests, with each filter I/O being provided with a tag for identification. The filter I/O tagging permits the filter framework 47 to identify the originating access quota filter of the filter I/O. One advantage to providing filter I/O tagging is to avoid conflicts that may occur with multiple I/O requests from a single filter source. In addition, filter I/O tagging contributes to permitting the filter framework 47 to determine if the filter I/O has a particular priority, based on the filter priority. Access quota filters with higher priority can potentially receive a greater time slice of available processing time. Accordingly, by tagging the filter I/O, the filter framework 47 can allocate processing time to I/O requests more appropriately.

In one embodiment, the access quota management 61 can be cascaded. Multiple quota filters can be stacked so that there can be multiple quota instances. For example, the data access requests will route to the first quota filter, then to the next quota filter. Until all access quota filters have approved the data access request, then the data access request can proceed. To approve a data access request means to pass the request down the filter stack and to pass the reply for request from below up without alteration. Based on the nature of the data access request, some quota filters need to update the runtime usage database 42B. In one embodiment, multiple-directory quota is stacked with multiple node quota.

In another embodiment, the access quota management 61 is implemented in the kernel space. In another embodiment, the access quota management 61 is implemented in the user space. User mode or user space is typically ring 3 of the protection rings of fault tolerance and computer security, while the kernel mode or kernel space is ring 0. Normally, the kernel mode runs the operating system (OS), so quota filter can run in kernel mode. The filter framework 47 enumerates the access quota management 61 (e.g., access quota filters) and makes callouts one by one in operation 608. The filter framework 47 uses incoming requests, and forwards the incoming requests to each of the access quota management's requested callback. In the return path, the filter framework 47 receives filter's response data, enumerates filters, and invokes filter's response callback in operation 612. For example, as described below, the response data may indicate that the data access request should be denied because it violates the access quota policy. The response data in operation 612 may include the access quota action, as specified by the enabler 23, in response to violating the access quota policy. Alternatively, the response data may indicate other operations, as defined by the access quota policy.

The filter framework 47 may filter the data access request order and perform conflict management of the data access request. The filter framework 47 may ensure that data access requests are ordered in the correct form. When the filters are ordered, any data access request generated from the filters may be identified through predefined tags. In one embodiment, the filter framework 47 may invoke read requests for quota through the filter callout module 608. The access quota filter 41 may register itself into the filter framework 47 for callbacks on data access requests, for example, stored in memory of the storage server, such as file open or create, read, directory read, write, or the like.

The filter framework 47 invokes a filter request callback on the incoming path, and response callback on the return path. The filter callout uses a special request/response structure for each data access request. The structure ranges from parameters needed for system calls in open systems or to special-designed protocol systems, such as file ID, volume ID, data access request type, originating IP address, time, priority, originator ID, data access request related parameters, or the like. Additional filter callout parameters may include protocol type. The callout module can be a function call or a message pass. Filter callout invokes read request functions of the quota filter via mechanisms, such as function calls or message passes.

The access quota management 61 (e.g., access quota filter 41 or access quota manager 51) may be configured to perform various operations. The access quota management 61 is configured to monitor and detect quota-sensitive data access requests based on the access quota policy database 42 configured in operation 602. For example, a user A has an access quota that limits the user from performing a directory listing more than 3 times per second. The access quota also specifies that future data access requests will be throttled in response to violation of the access quota. If the data access request is not quota sensitive, the method moves to operation 613 to forward the request to the file system. For access quota accounting on the storage system, the access quota may be based on the client entity, such as the user, user group, application, or the like. The access quota accounting includes a number that gets incremented each time that a quota-sensitive data access request occurs, regardless of whether the data access request was successful or not. The access quota accounting can also track the number of successful and failed quota-sensitive data access requests. The access quota accounting may be implemented in the access quota management 61, or alternatively, in an access quota database manager, which also stores the access quota policy database 42. The access quota policy database 42 may be used to store information for the global quota (e.g., current access pattern, a number representative of the total number of data access requests by the user). Also, information regarding the client entity, the total usage, the quota type, the target entity may be stored in the access quota policy database 42. In another embodiment, the runtime usage database may be used to store information for each quota-sensitive data access request, such as the client entity, the type of data access request, the response status, the target entity, or the like. It should be noted that not all data access requests need to be counted. In one embodiment, only the data access requests based on all the access policies can be counted, and if policies change, then new counting can be enabled, while other counting will not be continued. The access quota may be based on quota-sensitive data access requests, such as read, write, read directory, open file, or the like. If the access quota configuration database 42A doesn't have enough quota for the particular data access request, there is no need to count it. That is, only the data access requests that fall into the quota configuration are counted.

In one embodiment, the access quota accounting can be automatically restarted if an enabler action has occurred. Alternatively, the count of quota-sensitive data access requests may be restarted manually, such as by an administrator.

The access quota management 61 calculates results for multiple data access requests by checking the access pattern against the access quota of the access quota policy database 42. If the access quota policies indicate a certain enable action needs to be called, then the access quota management calls the enabling action at operation 610; otherwise, the method moves to operation 613 to forward the request to the file system. For example, a guest group of users may have an access quota of 200 data access requests in a working day on the node 2 or 52. If the guest group of users meets or exceeds the access quota of 200, by accessing the node 2 or 52, 200 or more times in the working day, then a system rule, such as access denial, can be executed to prevent the guest group of users from accessing storage resources on node 2 or 52.

In one embodiment of an access quota for an open data access request, when a client opens a file, which is a quota-sensitive data access request, the access quota is updated (e.g., incremented) by the access quota management, and then the access quota management determines if an access quota policy has been violated. If any action needs to happen, the access quota management enables the action by calling the enabling action in operation 610. Open access quota can be used, for example, to defend against excessive attempts by a non-owner trying to access sensitive data, such as confidential information.

In another embodiment of an access quota for a read data access request, when the client reads a file, which is a quota-sensitive data access request, the access quota is updated (e.g., incremented) by the access quota management, and then the access quota management determines if an access quota policy has been violated. If any action needs to happen, the access quota management enables the action by calling the enabling action in operation 610. Read access quota can be used, for example, to defend against excessive attempts by a lower-priority user attempting to access lower-priority information.

In another embodiment of an access quota for a write data access request, when the client writes a file, which is a quota-sensitive data access request, the access quota is updated (e.g., incremented) by the access quota management, and then the access quota management determines if an access quota policy has been violated. If any action needs to happen, the access quota management enables the action by calling the enabling action in operation 610. Write access quota can be used, for example, to change a priority for the nature of applications based on the number of writes happening.

In another embodiment of an access quota for a directory read data access request, when the client reads a directory, which is a quota-sensitive data access request, the access quota is updated (e.g., incremented) by the access quota management, and then the access quota management determines if an access quota policy has been violated. If any action needs to happen, the access quota management enables the action by calling the enabling action in operation 610. Read directory access quota can be used, for example, to defend against excessive directory browsing, and may notify the administrator of this fact, as part of the enabling action.

Alternatively, other types of file system data access requests or a combination of file system data access requests can be designated as quota-sensitive data access requests.

As described above, in response to the policy evaluation, an enabling action may be called at operation 610 by the access quota management 61. The access quota management 61 executes a given action on the given data access request based on the access quota policy using the access quota enabler 43. The following access quota actions may be executed, as well as other types of actions not listed below: 1) A denial action may be performed that terminates the given data access request, and returns a preconfigured error code. 2) A throttle action may be performed that puts the given data access request into a queue that is designated as low priority. The throttling action adds a certain delay to the given data access request to slow down the data access request. 3) An alert action may be performed to email or use another type of mechanism to alert the administrator and/or the user that a violation of access quota has occurred. 4) A file deletion action may be performed to delete a file (or data) after a predefined number of read data access requests to the file (e.g., one read data access request of a designated file may trigger a delete operation of the designated file). 5) An audit action may be performed to enable or disable an audit or delete audit information. The above access quota actions may be combined together or with any other type of action; however, it should be noted that the denial action results in termination of the data access request in operation 612. Otherwise, if the access quota action is not a denial action, the method directs the data access request to operation 613.

In one embodiment, for certain access quota actions, such as access denial, the enabler 23 returns back to the filter framework 47 to deny the given data access request with a preconfigured error codes, such as EQUOTA, which means that the user has accessed more storage resources than allocated by the access quota (e.g., no remaining quota for this data access request).

In one embodiment, a cached copy, such as a read-only copy, of all or a portion of the access quota policy database 42 is stored locally to facilitate access on the respective nodes. In another embodiment, a ticket is used to decide how long to keep the cached copy on the respective node. The cached copy may be used to facilitate an expedited lookup operation for subsequent lookup operations to the access quota database 42 (e.g., access quota configuration database 42A or runtime usage database 42B) to determine whether the access quota has been violated or not for the particular data access request.

If it is determined that quota is not met or exceeded by the current data access request (or if the received data access request is not a quota-sensitive data access request), the data access request is forwarded to the file system layer 21 in operation 613. The file system layer 21 receives the incoming requests, processes the requests, sends the requests to the storage access layer 24 and storage drivers 25 for processing, and upon receiving the results from the storage access layer 24 and storage drivers 25, the file system layer 21 processes the results by packaging the result into the response data, and forwards the response data on the return path to the access quota management (e.g., access quota filter 41 or access quota manager 51) at operation 615.

It should be noted that although the embodiments of FIG. 6 are illustrated and described as implementing an access quota over a single volume, the embodiments described herein may be implemented in other storage sets, such as multiple volumes, aggregates, on a single node, or alternatively, across multiple nodes.

Figure 7:
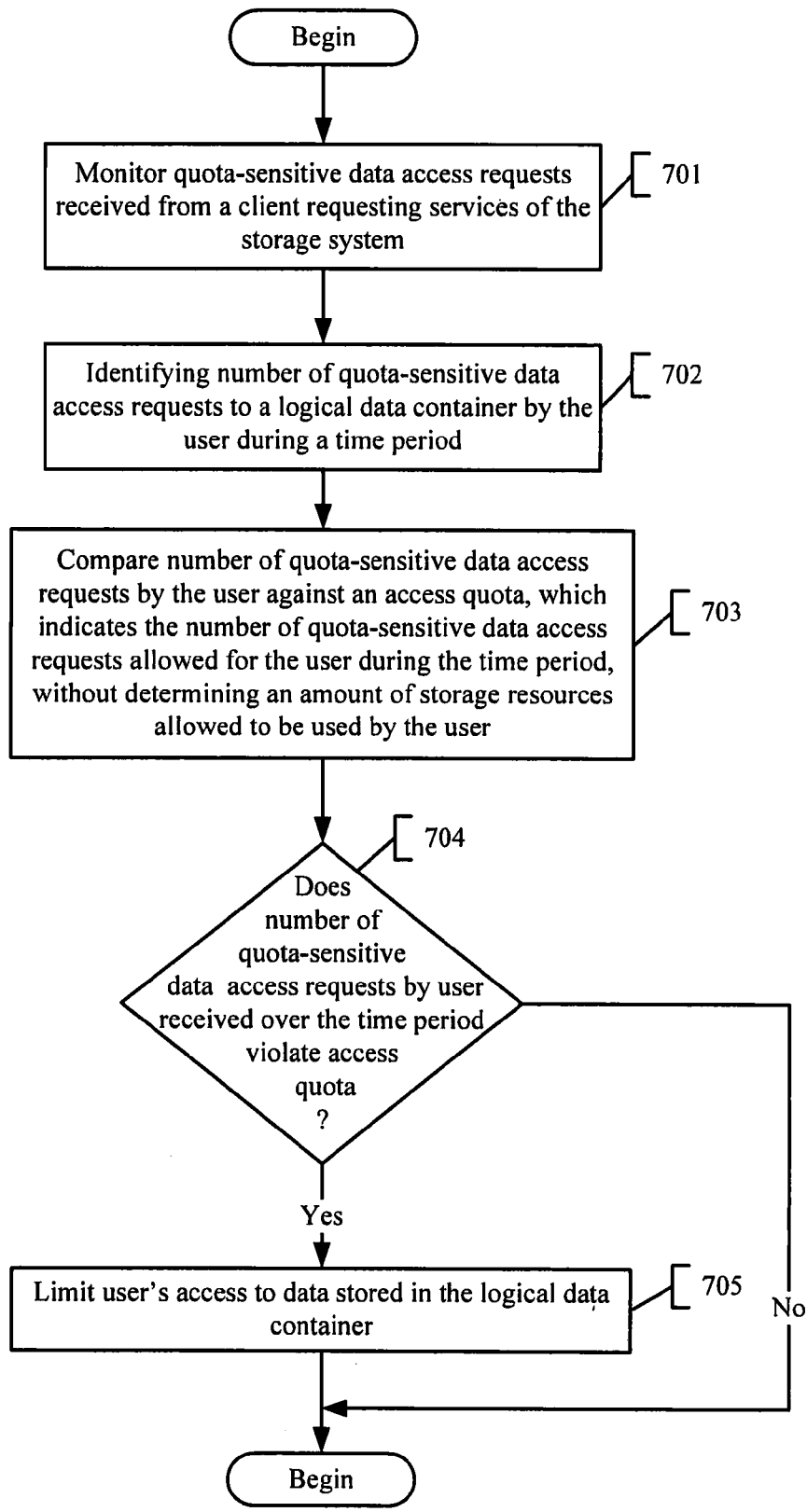
FIG. 7 illustrates one embodiment of a flow chart of a method of limiting a user's access to stored data based on an access quota and an access pattern by the user.

FIG. 7 illustrates one embodiment of a method of limiting a user's access to stored data based on an access quota and an access pattern by the user. In operation 701, a storage server monitors quota-sensitive data access requests received from a client requesting services of the storage system. In operation 702 the storage server identifies the number of quota-sensitive data access requests to a logical data container by the user during a time period. In operation 703 the storage server compares the number of quota-sensitive data access requests by the user against an access quota, which indicates the number of quota-sensitive data access requests allowed for the user during the time period, without determining an amount of storage resources allowed to be used by the user. If the number of quota-sensitive data access requests by the user received over the time period violates the access quota (704), then in operation 705 the storage server limits access to data stored in the logical data container.

Embodiments of the present invention include various operations, as described above. These operations may be performed by hardware components, software, firmware, or a combination thereof. The various operations may be performed by executing one or more computer programs to perform functions of the embodiments by operating on input data and generating output data. The various operations may also be implemented in, for example, special purpose logic circuitry, e.g., a field programmable gate array (FPGA), digital signal processor (DSP), Application-specific integrated circuit (ASIC), programmable logic device (PLD), or the like).

Certain embodiments may be implemented as one or more computer program products. The one or more computer programs may be tangibly embodied in an information carrier, e.g., in a machine-readable storage device or in a propagated signal, for execution by, or to control the operation of, one or more general-purpose or special-purpose processors to perform the described operations. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM disks); digital video disk (DVD) ROM disks, magneto-optical storage medium; read-only memory (ROM); random-access memory (RAM); erasable programmable memory (e.g., EPROM and EEPROM); flash memory; electrical, optical, acoustical, or other form of propagated signal (e.g., carrier waves, infrared signals, digital signals, etc.); or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

The processing device(s) described herein may include one or more general-purpose processing devices such as a microprocessor or central processing unit, a controller, or the like. Alternatively, the digital processing device may include one or more special-purpose processing devices such as a DSP, an ASIC, an FPGA or the like. In an alternative embodiment, for example, the digital processing device may be a network processor having multiple processors including a core unit and multiple microengines. Additionally, the digital processing device may include any combination of general-purpose processing device(s) and special-purpose processing device(s).

Although the operations of the method(s) herein are shown and described in a particular order, the order of the operations of each method may be altered so that certain operations may be performed in alternate orders or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method performed by a storage system, comprising:
    determining an access pattern of data access requests by a user to storage resources of a storage system;
    comparing the access pattern of the user against an access quota without determining an amount of storage resources allowed to be used by the user; and
    limiting access by the user to storage resources of the storage system when the access quota has been exceeded, wherein limiting access to the storage resources includes throttling access by the user to a storage resource by using a system-provided queue to delay access to the storage resource by the user.

2. The method of claim 1, wherein delaying access comprises temporarily lowering an access priority of the user.

3. The method of claim 1, wherein the access quota comprises access attributes for each user, and wherein the access attributes comprise at least one of a group, a type of group, a level of security access, a number of data access requests allowed for a particular user, a time period, a number of operations allowed for a particular user, a number of data requests to a particular directory of a logical data container, a number or users that have accessed the logical data container, a number of clients that have accessed the logical data container, or an access priority of a particular user.

4. The method of claim 1, wherein determining the access pattern comprises determining a number of data access requests by the user during a time period, wherein determining the number of data access requests comprises performing a lookup operation in a first data store that stores the number of data access requests by the user during a defined time period, wherein comparing comprises performing a lookup operation in a second data store that stores the access quota, and wherein the access quota comprises a limit on a number of data access requests by the user during a time period.

5. The method of claim 1, wherein determining the access pattern comprises:
    monitoring data access requests for the user on the storage system to check for a quota-sensitive data access request; and
    determining the access pattern by the user during a time period based on the monitoring, wherein the quota-sensitive data access request comprise at least one of: creating a new file, reading an existing file, deleting an existing file, or writing to an existing file to append the data of the existing file.

6. The method of claim 1, wherein the access quota comprises a limit on access to a storage area that is designated as having sensitive data based on an access priority of the user.

7. The method of claim 1, wherein the access quota comprises a soft-quota definition, wherein executing the system rule comprises generating a warning indicating that the user has exceeded the access quota, wherein the access quota further comprises a hard-quota definition, and wherein executing the system rule comprises preventing fulfillment of a quota-sensitive data access request that would exceed the access quota.

8. A storage server, comprising:
    a processor comprising an access quota manager and an access quota enabler;
    a first communication interface through which to communicate with a plurality of storage devices;
    a second communication interface through which to communicate with a client of the storage server; and
    a memory storing instructions which configure the processor to receive data access requests from the client at the access quota manager, to monitor the data access requests for quota-sensitive data access requests, to determine an access pattern by the user during a time period using the access quota manager, to compare the access pattern by the user against an access quota policy stored in an access policy data store coupled to the access quota manager without determining an amount of storage resources allowed to be used by the user, and to limit access to data on the plurality of storage devices using an access quota enabler when the access pattern violates the access quota policy, wherein limiting access to the data includes throttling access by the user to a storage resource by using a system-provided queue to delay access to the storage resource by the user.

9. The storage server of claim 8, wherein the access quota manager is configured to determine the access pattern by determining an amount of data access requests by the user during a time period, and comparing the amount data access requests against the access quota, which indicates a number of data access requests allowed for the user during the time period, to determine if the access pattern violates the access quota policy.

10. The storage server of claim 8, wherein the access quota manager is implemented as at least one of an access quota protocol filter or an access quota file system filter.

11. The storage server of claim 8, wherein the access quota manager is embedded in a protocol layer of an operating system of the processor or in a file system layer of an operating system of the processor.

12. The storage server of claim 8, wherein the access quota policy defines a type of access quota action to be performed by the access quota enabler for different types of access patterns by the user, and wherein the access quota enabler triggers access quota actions when the access pattern violates the access quota policy.

13. The storage server of claim 12, wherein the access quota policy is violated when the user performs a directory listing within a predetermined amount of time, and wherein the access quota action comprises preventing the user from performing a directory listing with a defined period of time after violating the access quota policy.

14. The storage server of claim 8, wherein the access quota policy comprises at least one of the following policy parameters: number of data access requests, a time period, type of data access request, type of user, type of client, type of work load, or type of application, and wherein the access quota policy is a Boolean expression of the policy parameters.

15. A method performed by a storage system, comprising:
monitoring quota-sensitive data access requests received from a client requesting services of the storage system;
identifying a number of quota-sensitive data access requests to a logical data container by a user during a time period;
comparing the number of quota-sensitive data access requests by the user against an access quota, which indicates a number of quota-sensitive data access requests allowed for the user during the time period, without determining an amount of storage resources allowed to be used by the user; and
limiting access to data stored in the logical data container when the number of quota-sensitive data access requests by the user received over the time interval violates the access quota, wherein limiting access to the data includes throttling access by the user to the data by using a system-provided queue to delay access to the data by the user.

16. The method of claim 15, wherein determining the number of quota-sensitive data access requests comprises performing a lookup operation in a first data store that stores the number of quota-sensitive data access requests by the user during the time period, and wherein said comparing comprises performing a lookup operation in a second data store that stores the access quota for the user.

17. A storage server, comprising:
a processor;
a first communication interface coupled to the processor, through which to communicate with a plurality of storage devices;
a second communication interface coupled to the processor, through which to communicate with a client of the storage server; and
a memory storing instructions which configure the processor to receive data access requests from the client, to monitor the data access requests for quota-sensitive data access requests, to determine a number of quota-sensitive data access requests to a logical data container by the user during a time period, to compare the number of quota-sensitive data access requests by the user against an access quota, which indicates a number of data access requests allowed for the user during the defined time period, stored in an access policy data store, and to limit access to data on the plurality of storage devices when the access pattern violates the access quota policy, wherein limiting access to the data includes throttling access by the user to the data by using a system-provided queue to delay access to the data by the user.

* * * * *